United States Patent
Miyasaka et al.

(10) Patent No.: US 8,567,214 B2
(45) Date of Patent: Oct. 29, 2013

(54) METHOD FOR PRODUCING GLASS BODY AND METHOD FOR PRODUCING OPTICAL MEMBER FOR EUV LITHOGRAPHY

(75) Inventors: Junko Miyasaka, Tokyo (JP); Akio Koike, Tokyo (JP); Tomonori Ogawa, Tokyo (JP); Masahiro Kawagishi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 2 days.

(21) Appl. No.: 13/169,459

(22) Filed: Jun. 27, 2011

(65) Prior Publication Data

US 2011/0314868 A1    Dec. 29, 2011

(30) Foreign Application Priority Data

Jun. 28, 2010    (JP) .................................. 2010-146549

(51) Int. Cl.
    *C03B 19/14*    (2006.01)
(52) U.S. Cl.
    USPC .................. 65/17.4; 65/17.3; 65/17.6; 431/2; 431/4
(58) Field of Classification Search
    USPC .................. 65/413–416, 446–447, 17.6, 17.4
    See application file for complete search history.

(56) References Cited

U.S. PATENT DOCUMENTS

| | | | | |
|---|---|---|---|---|
| 3,698,936 A | * | 10/1972 | Moltzan .......................... | 427/452 |
| 4,367,085 A | * | 1/1983 | Suto et al. ........................ | 65/415 |
| 4,406,680 A | * | 9/1983 | Edahiro et al. .................. | 65/416 |
| 4,465,708 A | * | 8/1984 | Fanucci et al. .................. | 65/416 |
| 4,474,593 A | * | 10/1984 | Andrejco et al. ................ | 65/415 |
| 4,618,354 A | * | 10/1986 | Suda et al. ....................... | 65/416 |
| 4,661,140 A | * | 4/1987 | Takimoto et al. ............... | 65/157 |

(Continued)

FOREIGN PATENT DOCUMENTS

| | | |
|---|---|---|
| EP | 2 145 865 A1 | 1/2010 |
| GB | 2 054 553 | 2/1981 |

(Continued)

OTHER PUBLICATIONS

Extended European Search Report issued Oct. 7, 2011, in Patent Application No. 11005264.4.

Primary Examiner — Jodi C Franklin
(74) Attorney, Agent, or Firm — Oblon, Spivak, McClelland, Maier & Neustadt, L.L.P.

(57) ABSTRACT

The present invention relates to a method for producing a glass body containing: hydrolyzing a silicon compound and a compound containing a metal serving as a dopant, in a flame projected from a burner to form glass fine particles; and depositing and growing the formed glass fine particles on a base material, in which a raw material mixed gas containing a gas of the silicon compound, a gas of the compound containing a metal serving as a dopant, and either one of a combustible gas and a combustion supporting gas is fed into a central nozzle (A) positioning in the center of the burner; the other gas of the combustible gas and the combustion supporting gas is fed into a nozzle (B) different from the central nozzle (A) of the burner; a combustible gas or a combustion supporting gas is arbitrarily fed into a nozzle different from the nozzles (A) and (B); and a flow rate of the raw material mixed gas is 50% or more and not more than 90% of the largest flow rate among flow rate(s) of the combustible gas (ses) and the combustion supporting gas(ses) fed from other nozzle or nozzles than the central nozzle (A).

20 Claims, 5 Drawing Sheets

(56) References Cited

U.S. PATENT DOCUMENTS

| | | | |
|---|---|---|---|
| 4,801,322 A * | 1/1989 | Suda et al. | 65/144 |
| 4,810,189 A * | 3/1989 | Mikami et al. | 431/354 |
| 4,826,520 A * | 5/1989 | Kawazoe et al. | 65/414 |
| 4,915,716 A * | 4/1990 | Monroe et al. | 65/416 |
| 5,599,371 A | 2/1997 | Cain et al. | |
| 5,922,100 A * | 7/1999 | Cain et al. | 65/531 |
| 6,363,746 B1 * | 4/2002 | Wei et al. | 65/17.4 |
| 6,705,115 B2 * | 3/2004 | Matsuo et al. | 65/17.4 |
| 6,725,690 B2 * | 4/2004 | Enomoto et al. | 65/414 |
| 7,299,659 B2 * | 11/2007 | Roba et al. | 65/421 |
| 7,441,416 B2 * | 10/2008 | Roba et al. | 65/414 |
| 7,585,598 B2 * | 9/2009 | Maida et al. | 430/5 |
| 2002/0144517 A1 * | 10/2002 | Fujiwara et al. | 65/17.4 |
| 2002/0157421 A1 * | 10/2002 | Ackerman et al. | 65/17.6 |
| 2003/0200770 A1 * | 10/2003 | Johnson | 65/397 |
| 2004/0168472 A1 * | 9/2004 | Enomoto et al. | 65/17.4 |
| 2005/0000251 A1 * | 1/2005 | Dabby et al. | 65/414 |
| 2005/0132749 A1 * | 6/2005 | Otsuka et al. | 65/17.4 |
| 2006/0137404 A1 * | 6/2006 | Nunome et al. | 65/421 |
| 2006/0162389 A1 * | 7/2006 | Cognolato et al. | 65/414 |
| 2007/0074541 A1 * | 4/2007 | Badding et al. | 65/413 |
| 2008/0287279 A1 * | 11/2008 | Bookbinder et al. | 501/53 |
| 2009/0017257 A1 * | 1/2009 | Otsuka et al. | 428/141 |
| 2009/0029842 A1 * | 1/2009 | Khrapko et al. | 501/53 |
| 2009/0211301 A1 * | 8/2009 | Yoshida | 65/421 |
| 2009/0288448 A1 * | 11/2009 | Maida et al. | 65/60.53 |
| 2010/0003609 A1 * | 1/2010 | Maida et al. | 430/5 |
| 2011/0117480 A1 * | 5/2011 | Maida et al. | 430/5 |
| 2011/0203318 A1 * | 8/2011 | Otsuka et al. | 65/17.4 |
| 2011/0314868 A1 * | 12/2011 | Miyasaka et al. | 65/17.4 |
| 2012/0058419 A1 * | 3/2012 | Maida et al. | 430/5 |

FOREIGN PATENT DOCUMENTS

| | | |
|---|---|---|
| JP | 2008-115054 | 5/2008 |
| JP | 2011-42511 | 3/2011 |
| WO | WO 2010/098352 A1 | 9/2010 |

* cited by examiner

METHOD FOR PRODUCING GLASS BODY AND METHOD FOR PRODUCING OPTICAL MEMBER FOR EUV LITHOGRAPHY

TECHNICAL FIELD

The present invention relates to a method for producing a glass body and a method for producing an optical member for EUV lithography.

BACKGROUND ART

There have hitherto been disclosed some technologies regarding a method for producing a glass material and a method for producing an optical member for EUV lithography.

For example, JP-A-2008-115054 (Patent Document 1) discloses a method for producing a titania-silica glass which is used as an optical member such as a photomask and a mirror of extreme ultraviolet lithography (EUV lithography) in a manufacturing process of semiconductors, liquid crystals or the like.

Specifically, Patent Document 1 discloses a method for producing a titania-silica glass, comprising feeding a gas prepared by vaporizing a liquid raw material of a silica source and a gas prepared by vaporizing a liquid raw material of a titania source from separate tube selected from a first introduction tube which is center of a multiple tube of a concentric multitubular burner, a second introduction tube adjoining the periphery of the first introduction tube, and a third introduction tube adjoining the periphery of the second introduction tube; hydrolyzing the gases in an oxyhydrogen flame projected from the burner; depositing glass fine particles on a target; and then subjecting the glass fine particles to a thermal vitrification treatment.

Also, Patent Document 1 discloses that the gas prepared by vaporizing a liquid raw material of a silica source is fed from the first introduction tube, and the gas prepared by vaporizing a liquid raw material of a titania source is fed from the third introduction tube sandwiched between an oxygen introduction tube and a hydrogen introduction tube; and that hydrogen is fed from the second introduction tube, and oxygen is fed from a fourth introduction tube adjoining the periphery of the third introduction tube.

Here, in the conventional production method of a titania-silica glass as disclosed in Patent Document 1, for example, the flow rate of the gas prepared by vaporizing a liquid raw material of a silica source and the flow rate of the gas prepared by vaporizing a liquid raw material of a titania source are generally set to values larger than the flow rate of the hydrogen gas and the flow rate of the oxygen gas. According to this, diffusion of the gas prepared by vaporizing a liquid raw material of a silica source and the gas prepared by vaporizing a liquid raw material of a titania source by the hydrogen gas and the oxygen gas is reduced. As a result, it is considered that it becomes possible to enhance a yield of the titania-silica glass.

However, with respect to the titania-silica glass produced by the conventional production method of a titania-silica glass, in some case, uniformity of the concentration distribution of titanium in the titania-silica glass was low.

Also, the concentration distribution of titanium in the titania-silica glass correlates with the distribution of a coefficient of thermal expansion of the titania-silica glass. For that reason, in some case, uniformity of the distribution of a coefficient of thermal expansion of the titania-silica glass produced by the conventional production method of titania-silica glass was low.

Meanwhile, when the titania-silica glass is used as a glass substrate of an optical member of EUV lithography, the distribution of a coefficient of thermal expansion of the titania-silica glass is required to have higher uniformity. For that reason, when the titania-silica glass is used as a glass substrate of an optical member of EUV lithography, in some case, uniformity in the distribution of a coefficient of thermal expansion of the titania-silica glass produced by the conventional production method of a titania-silica glass was insufficient.

Patent Document 1: JP-A-2008-115054

SUMMARY OF THE INVENTION

One object of the invention is to provide a method for producing a quartz glass body containing a metal dopant and having more uniform concentration distribution.

Another object of the invention is to provide a method for producing an optical member for EUV lithography containing a glass substrate having a more uniform coefficient of thermal expansion.

The present invention provides a method for producing a glass body containing: hydrolyzing a silicon compound and a compound containing a metal serving as a dopant, in a flame projected from a burner, to form glass fine particles; and depositing and growing the formed glass fine particles on a base material, in which a raw material mixed gas containing a gas of the silicon compound, a gas of the compound containing a metal serving as a dopant, and either one of a combustible gas and a combustion supporting gas is fed into a central nozzle (A) positioning in the center of the burner;

the other gas of the combustible gas and the combustion supporting gas is fed into a nozzle (B) different from the central nozzle (A) of the burner;

a combustible gas or a combustion supporting gas is arbitrarily fed into a nozzle different from the nozzles (A) and (B); and a flow rate of the raw material mixed gas is 50% or more and not more than 90% of the largest flow rate among flow rate(s) of the combustible gas(es) and the combustion supporting gas(es) fed from other nozzle or nozzles than the central nozzle (A).

In the method for producing a glass body of the present invention, it is preferred that a noncombustible gas is fed into a nozzle provided between a nozzle fed with a combustible gas or a mixed gas containing a combustible gas and a nozzle fed with a combustion supporting gas or a mixed gas containing a combustion supporting gas.

In the method for producing a glass body of the present invention, it is preferred that the burner has further one or more nozzles fed with a combustible gas, a combustion supporting gas, a mixed gas containing a combustible gas, or a mixed gas containing a combustion supporting gas, other than the central nozzle (A) and the nozzle (B); and a flow rate of the gas fed from the nozzle spatially most far from the central nozzle (A) among the one or more nozzles is not more than 95% of the flow rate of the raw material mixed gas.

In the method for producing a glass body of the present invention, it is preferred that the burner is a burner having a multitubular structure.

In the method for producing a glass body of the present invention, it is preferred that the burner having a multitubular structure containing the central nozzle, a first peripheral nozzle surrounding the central nozzle, a second peripheral nozzle surrounding the first peripheral nozzle, and a third peripheral nozzle surrounding the second peripheral nozzle;

the raw material mixed gas is a mixed gas containing a combustible gas, and the raw material mixed gas is fed into the central nozzle of the burner having a multitubular structure;

a combustible gas is fed into the first peripheral nozzle;

a noncombustible gas is fed into the second peripheral nozzle; and a combustion supporting gas is fed into the third peripheral nozzle.

In the method for producing a glass body of the present invention, it is preferred that the burner having a multitubular structure containing the central nozzle, a first peripheral nozzle surrounding the central nozzle and a second peripheral nozzle surrounding the first peripheral nozzle;

the raw material mixed gas is a mixed gas containing a combustible gas, and the raw material mixed gas is fed into the central nozzle of the burner having a multitubular structure;

a noncombustible gas is fed into the first peripheral nozzle; and a combustion supporting gas is fed into the second peripheral nozzle.

In the method for producing a glass body of the present invention, it is preferred that the metal serving as a dopant is Ti.

In the method for producing a glass body of the present invention, it is preferred that a mass of the glass body is 50 kg or more.

The present invention provides a method for producing an optical member for EUV lithography using a glass body produced by the method for producing a glass body of the present invention.

According to an embodiment of the invention, a quartz glass body having more uniform concentration distribution of a metal dopant is obtainable.

According to another embodiment of the invention, it is possible to provide a method for producing an optical member for EUV lithography containing a glass substrate having a more uniform coefficient of thermal expansion.

MODES FOR CARRYING OUT THE INVENTION

The production method of a glass body of the present invention is described below. The present invention is concerned with a method for producing a glass body comprising: hydrolyzing a silicon compound and a compound containing a metal serving as a dopant, in a flame projected from a burner to form glass fine particles; and depositing and growing the formed glass fine particles on a base material.

As such a method, there is a method which comprises: hydrolyzing a silicon compound and a compound containing a metal serving as a dopant, in a flame projected from a burner, to form glass fine particles; and, while further heating the formed glass fine particles at a temperature of a transparent vitrification temperature or higher, depositing and growing the formed glass fine particles on a base material to obtain a transparent glass (direct method).

Also, there is a method which comprises: hydrolyzing a silicon compound and a compound containing a metal serving as a dopant, in a flame projected from a burner, to form glass fine particles; depositing and growing the formed glass fine particles on a base material to produce a porous glass body; and heating the porous glass body at a temperature of a transparent vitrification temperature or higher to obtain a transparent glass. The method may be such a method comprising, in the above step of heating the porous glass body, heating the porous glass body at a densifying temperature or higher to obtain a densified body, and thereafter, further heating the densified body at a transparent vitrification temperature to obtain the transparent glass body (soot method).

The latter method is hereunder described in detail, but it should not be construed that the invention is limited thereto.

FIGS. 1A to 1E are each a view diagrammatically explaining the whole of the production method of a porous glass body and the method for producing a glass material from the porous glass body in the present invention.

The method shown in FIGS. 1A to 1E for producing a porous glass body according to the present invention is in conformity with a method which is generally called a soot method.

Figure 1A:
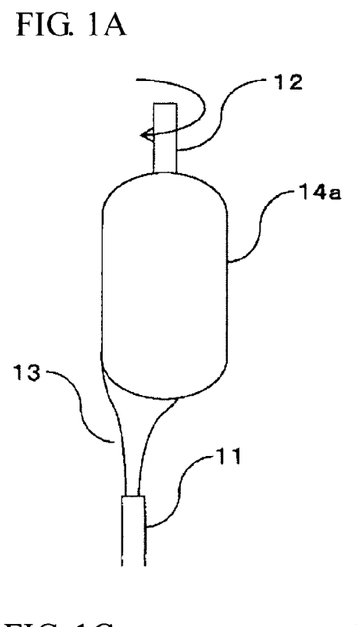
FIGS. 1A to 1E are each a view diagrammatically explaining the whole of the production method of a porous glass body and the method for producing a glass material from the porous glass body in the present invention.

First of all, as shown in FIG. 1A, for example, a gas, which contains such as a gas of a silicon compound and a gas of a metal compound serving as a metal dopant, serves as a raw material of a quartz glass body containing a metal dopant (the gas serving as a raw material is also referred to as a "raw material gas" hereinafter); a combustion supporting gas; a combustible gas (the combustion supporting gas and the combustible gas are also collectively referred to as a "reactant gas" hereinafter); and the like are fed from a multitubular burner 11. Furthermore, a noncombustible gas can be arbitrarily fed.

In the invention, a raw material mixed gas containing the gas of a silicon compound, the gas of a compound containing a metal serving as a dopant, and either one of the combustible gas and the combustion supporting gas is fed into the central nozzle (A) positioning in the center of the foregoing burner. These gases are described below.

As the silicon compound, a compound capable of forming $SiO_2$ upon being hydrolyzed (hereinafter also referred to as an "$SiO_2$ precursor") can be used. Examples of the $SiO_2$ precursors include halogenated silicon compounds such as silicon chloride compounds, silicon fluoride compounds, silicon bromide compounds and silicon iodide compounds; and alkoxysilanes represented by $R_nSi(OR)_{4-n}$ (wherein R represents an alkyl group having 1 to 4 carbon atoms, and n represents an integer of 0 to 3, provided that each R may be the same as or different from each other).

Examples of the silicon chloride compounds include tetrachlorosilane ($SiCl_4$), trichlorosilane ($SiHCl_3$), dichlorosilane ($SiH_2Cl_2$), and monochlorosilane ($SiH_3Cl$). Examples of the silicon fluoride compounds include tetrafluorosilane ($SiF_4$), trifluorosilane ($SiHF_3$) and difluorosilane ($SiH_2F_2$). Examples of the silicon bromide compounds include tetrabromosilane ($SiBr_4$) and tribromosilane ($SiHBr_3$). Examples of the silicon iodide compounds include tetraiodosilane ($SiI_4$).

A content of the $SiO_2$ precursor gas in the whole of the raw material mixed gas is preferably 7% by mole or more and not more than 27% by mole, more preferably 12% by mole or more and not more than 22% by mole, and still more preferably 16% by mole or more and not more than 18% by mole.

As the metal serving as a dopant, titanium is preferable. The case of containing $TiO_2$ as the metal dopant is hereunder described, but it should not be construed that the invention is limited thereto. As a compound containing Ti as the metal serving as a dopant, a compound capable of forming $TiO_2$ upon being hydrolyzed (hereinafter also referred to as a "$TiO_2$ precursor") can be used. Examples of the $TiO_2$ precursor include halogenated titanium compounds such as titanium tetrachloride ($TiCl_4$) and titanium tetrabromide ($TiBr_4$); and alkoxytitaniums represented by $R_nTi(OR)_{4-n}$ (wherein R represents an alkyl group having 1 to 4 carbon atoms, and n represents an integer of 0 to 3, provided that each R may be the same as or different from each other).

A content of the $TiO_2$ precursor gas in the whole of the raw material mixed gas is preferably 0.2% by mole or more and not more than 1% by mole.

Also, by adjusting a ratio of an amount of the $SiO_2$ precursor gas and an amount of the $TiO_2$ precursor gas in the raw material mixed gas, it is possible to control a concentration of $TiO_2$ in a glass body ($TiO_2$—$SiO_2$ glass body). In the case of producing a porous glass body (porous $TiO_2$—$SiO_2$ glass body), it is possible to control a concentration of $TiO_2$ in the porous glass body.

The combustible gas as referred to herein means a gas capable of being combusted in the presence of a combustion supporting gas. Examples of the combustible gas include hydrogen ($H_2$) gas and hydrocarbon gases such as methane, ethane, propane and butane. Of these, hydrogen ($H_2$) gas is preferable.

The combustion supporting gas as referred to herein means a gas necessary for the combustible gas to combust upon forming a flame. Examples of the combustion supporting gas include oxygen ($O_2$) gas and mixtures of nitrogen ($N_2$) gas and oxygen ($O_2$) gas, such as air. Of these, oxygen ($O_2$) gas is preferable.

Though either the combustible gas or the combustion supporting gas is contained in the raw material mixed gas, it is especially preferable that the combustible gas is contained in the raw material mixed gas.

A content of the combustible gas or the combustion supporting gas in the raw material mixed gas is preferably 10% by mole or more and not more than 90% by mole, more preferably 30% by mole or more and not more than 80% by mole, and still more preferably 45% by mole or more and not more than 70% by mole.

Also, in the whole of gases composed of the raw material gas, combustion supporting gas, combustible gas and other gases to be fed into the burner, a ratio of the total amount of the combustion supporting gas to the total amount of the combustible gas is preferably 0.50 or more. In that case, it is possible to sufficiently consume the combustible gas. The subject ratio of the combustion supporting gas is preferably 0.55 or more and not more than 1.00, more preferably 0.55 or more and not more than 0.85, and still more preferably 0.55 or more and not more than 0.78.

In the present invention, it is preferable that the raw material mixed gas contains the $SiO_2$ precursor gas, the $TiO_2$ precursor gas and the combustible gas. In that case, a ratio of the amount of the combustible gas to the amount of the combustion supporting gas in a region where the $SiO_2$ precursor gas and the $TiO_2$ precursor gas are present tends to become high. In response thereto, as compared with a thermal oxidation reaction of the $SiO_2$ precursor gas and the $TiO_2$ precursor gas, a hydrolysis reaction of the $SiO_2$ precursor gas and the $TiO_2$ precursor gas tends to become predominant. As a result, it becomes possible to increase the size of particles formed from the $SiO_2$ precursor gas and the $TiO_2$ precursor gas. Also, in the case of producing a porous glass body (porous $TiO_2$—$SiO_2$ glass body), it becomes possible to increase a bulk density thereof.

In the present invention, it is preferable that the raw material mixed gas further contains a noncombustible gas.

The noncombustible gas is a gas of a material (noncombustible material) which does not combust (is not oxidized) when the raw material mixed gas, the combustible gas, and the combustion supporting gas are allowed to react with each other.

Examples of the noncombustible gas include a rare gas such as helium, neon and argon; nitrogen ($N_2$) gas; a gas of carbon dioxide; water vapor; and a gas of a halogen halide such as a gas of hydrogen fluoride, a gas of hydrogen chloride and a gas of hydrogen bromide. From the viewpoint of a reduction of costs of the noncombustible gas, the noncombustible gas is preferably argon, nitrogen gas or a gas of carbon dioxide. Also, from the viewpoint of easier control of a temperature of a flame 13 projected from the multitubular burner 11, the noncombustible gas is preferably nitrogen gas or a gas of a polyatomic molecule (having higher specific heat than specific heat of a monoatomic molecule) such as a gas of carbon dioxide. Of these, nitrogen gas is especially preferable.

In the case where the raw material mixed gas contains a noncombustible gas, by adjusting a proportion of the noncombustible gas contained in the raw material mixed gas, it is possible to more easily control the temperature at which the raw material mixed gas, the combustible gas and the combustion supporting gas are allowed to react with each other, namely the temperature of the flame 13 projected from the multitubular burner 11 in a region which the raw material gas is present.

According to this, it is possible to more easily enhance uniformity of the concentration distribution of $TiO_2$ contained in the obtained glass body. In the case of producing a porous glass body (porous $TiO_2$—$SiO_2$ glass body), it is possible to more easily enhance uniformity of the concentration distribution of $TiO_2$ contained in the porous glass body. Therefore, generation of a $TiO_2$-containing crystal in a finally obtained $TiO_2$-containing quartz glass body can be reduced or prevented.

Additionally, since it becomes easy to control a flow rate of the raw material mixed gas, it becomes possible to enhance efficiency of the reaction of the $SiO_2$ precursor gas and the $TiO_2$ precursor gas.

A proportion of the noncombustible gas contained in the raw material mixed gas is preferably 5% by mole or more and not more than 70% by mole, more preferably 10% by mole or more and not more than 50% by mole, and still more preferably 15% by mole or more and not more than 35% by mole. When the proportion of the noncombustible gas contained in the raw material mixed gas is 5% by mole or more and not more than 70% by mole, it is possible to more easily realize a suitable temperature of the flame 13 projected from the multitubular burner 11.

As a result, it is possible to more easily enhance uniformity of the concentration distribution of $TiO_2$ contained in the glass body ($TiO_2$—$SiO_2$ glass body). In the case of producing a porous glass body (porous $TiO_2$—$SiO_2$ glass body), it is possible to more easily enhance uniformity of the concentration distribution of $TiO_2$ contained in the porous glass body. Therefore, generation of a $TiO_2$-containing crystal in a finally obtained $TiO_2$-containing quartz glass body can be reduced or prevented.

The raw material mixed gas may be prepared by previously mixing the $SiO_2$ precursor gas, the $TiO_2$ precursor gas, and the combustible gas or the combustion supporting gas (and the noncombustible gas) in a mixer. In that case, a portion of the $SiO_2$ precursor gas, the $TiO_2$ precursor gas, and the combustible gas or the combustion supporting gas (and the noncombustible gas) can be made uniform in the raw material mixed gas, and uniformity of the concentration distribution of $TiO_2$ in the produced $TiO_2$-containing quartz glass body can be enhanced more easily. Examples of the mixer include a premixing tank, a static mixer, a housing of filter, and a narrow conduit for projecting a jet stream.

Also, the foregoing gases are mixed preferably at a temperature of 75° C. or higher, more preferably at a temperature of 150° C. or higher, and still more preferably at a temperature of 180° C. or higher. In that case, it is possible to reduce or prevent liquefaction of the $SiO_2$ precursor gas and the $TiO_2$ precursor gas contained in the raw material gas. Also, the foregoing gases are preferably mixed at a temperature of not higher than 250° C.

FIGS. 1A to 1E are each a view diagrammatically explaining the case of producing a porous glass body by the method of the invention. As shown in FIG. 1A, a gas composed of the raw material mixed gas, the reactant gas and the noncombustible gas, which is fed from the multitubular burner 11, is directed to a rotating seed rod 12. Examples of the seed rod 12 include a "seed rod for the production of porous quartz glass preform" described in JP-B-63-24937. It is preferable that a central axis of the multitubular burner 11 is deviated from a central axis of the seed rod 12.

The combustible gas and the combustion supporting gas in the raw material mixed gas and the reactant gas to be fed from the multitubular burner 11 toward the seed rod 12 are allowed to react with each other to generate the flame 13, and simultaneously the $SiO_2$ precursor gas and the $TiO_2$ precursor gas are hydrolyzed by water produced from the combustible gas or the combustion supporting gas in the flame 13. Then, $SiO_2$ fine particles and $TiO_2$ fine particles generated in these reactions deposit on the seed rod 12. As a result, a porous preform 14a composed of $TiO_2$—$SiO_2$ is formed on the seed rod 12.

Figure 1B:
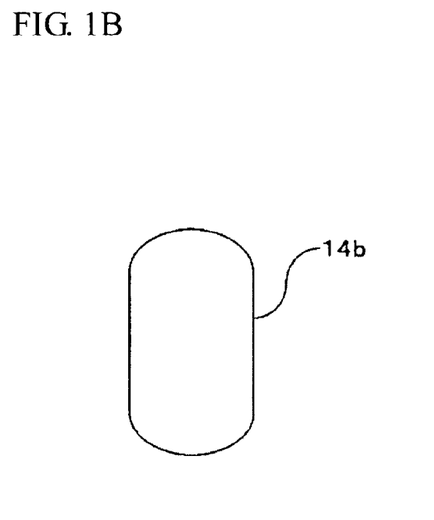

Subsequently, as shown in FIG. 1B, after the seed rod 12 is removed from the obtained porous preform 14a, the obtained porous preform 14a is heated to a densifying temperature of the porous preform 14a, thereby obtaining a densified glass preform 14b. It is preferable to perform the heating in vacuum or in an atmosphere of an inert gas. At that time, it is preferable to perform the heating at from 1,250 to 1,550° C.

Figure 1C:
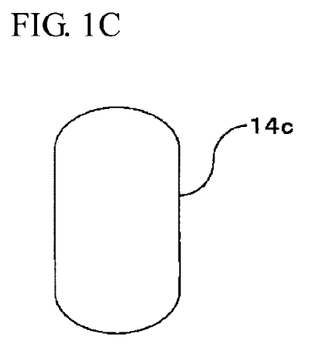

Subsequently, as shown in FIG. 1C, the obtained densified preform 14b is heated to a transparent vitrification temperature of the densified preform 14b, thereby obtaining a transparent glass body 14c At that time, it is preferable to perform the heating at from 1,350 to 1,800° C.

Figure 1D:
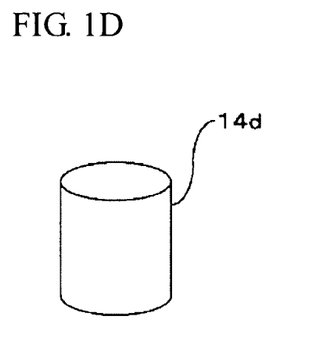

Subsequently, as shown in FIG. 1D, the obtained transparent glass body 14c is heated to a temperature of a softening point of the transparent glass body 14c or higher and also molded, thereby obtaining a molded glass body having a desired shape. By cooling the molded glass body, a $TiO_2$-containing quartz glass 14d is obtained. At that time, it is preferable to perform the heating at from 1,500 to 1,800° C.

Figure 1E:
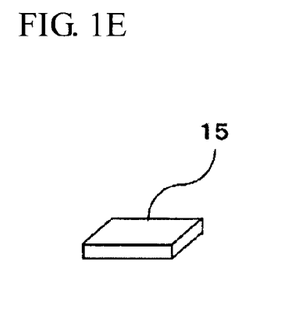

Finally, as shown in FIG. 1E, the obtained $TiO_2$-containing quartz glass is cut out into a plate shape, thereby obtaining a glass substrate 15.

In the present invention, in the case where the raw material mixed gas fed from the central nozzle (A) contains the combustible gas, the combustion supporting gas is fed from at least one nozzle (nozzle (B)) which is different from the central nozzle (A). Also, in the case where the raw material mixed gas contains the combustion supporting gas, the combustible gas is fed from at least one nozzle (nozzle (B)) which is different from the central nozzle (A). In each case, the combustible gas or the combustion supporting gas may be fed from one or more nozzles which are different from the nozzles (A) and (B). Though a number of nozzles, other than the central nozzle (A), from which the combustible gas or the combustion supporting gas is fed is not particularly limited, it may be considered to be from about 1 to 10.

In the present invention, the flow rate of the raw material mixed gas is 50% or more and not more than 90% of the largest flow rate among flow rate(s) of the combustible gas(es) and the combustion supporting gas(es) fed from other nozzle or nozzles than the central nozzle (A).

Incidentally, it is not preferable that the combustible gas or the mixed gas containing the combustible gas, and the combustion supporting gas or the mixed gas containing the combustion supporting gas are fed from nozzles adjacent to each other. It is preferable that the noncombustible gas is fed from a nozzle provided between the nozzles feeding the respective gases. According to this, a flow of the gas containing the combustible gas and a flow of the gas containing the combustion supporting gas can be separated from each other, so that it is possible to reduce or prevent the generation of backfire in the nozzles of the burner and damage of the nozzles of the burner.

Figure 2:
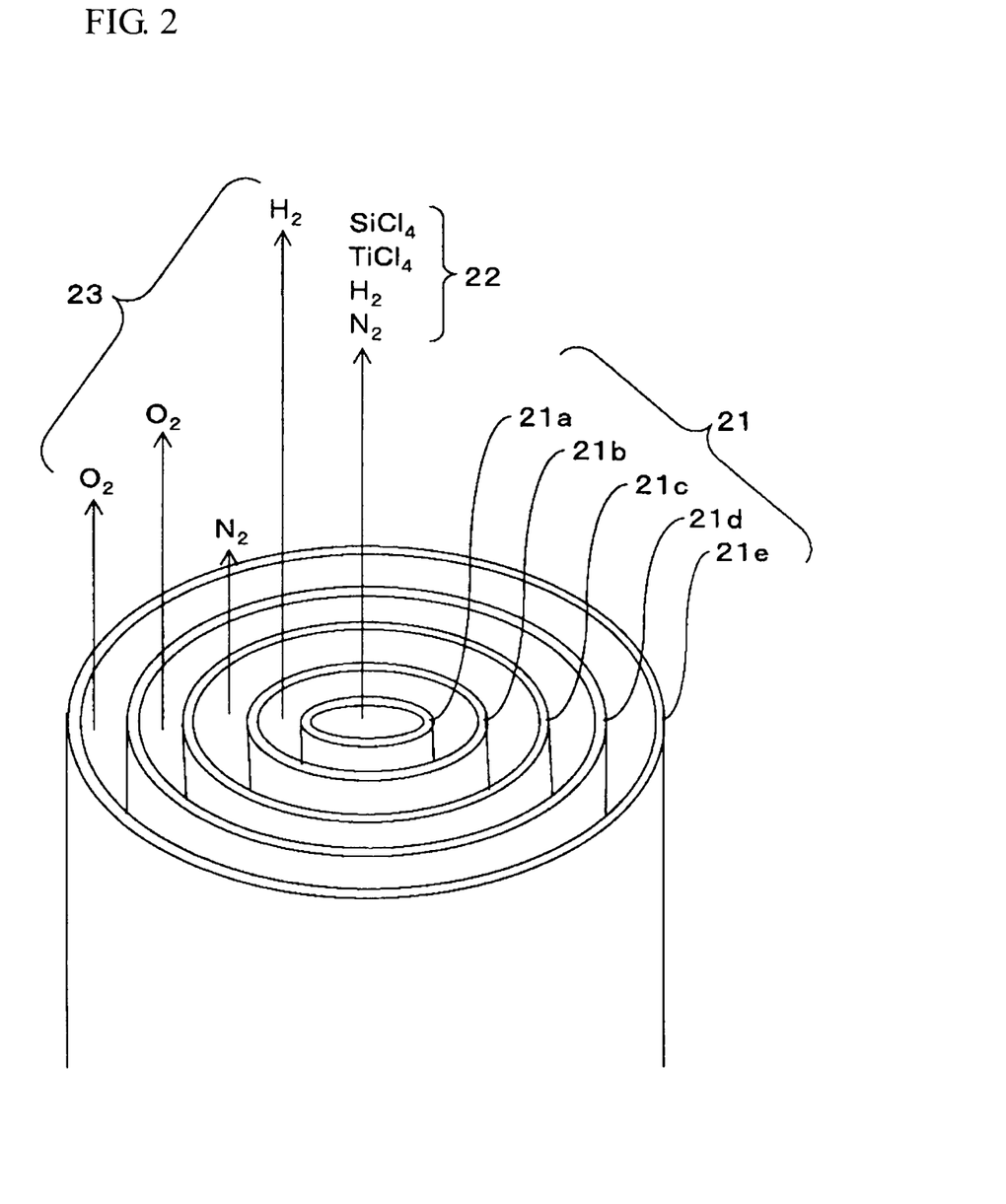
FIG. 2 is a view diagrammatically explaining flows of gases in the production method of a porous glass body in the present invention.

In the present invention, it is preferable to use a burner having a multitubular structure. The burner having a multitubular structure is hereunder described by reference to FIG. 2. FIG. 2 is a view diagrammatically explaining flows of gases in the production method of a porous glass body in the case of producing a porous glass body by the method of the present invention.

A multitubular burner 21 shown in FIG. 2 is an enlarged view of a tip of the multitubular burner 11 shown in FIG. 1. In the first embodiment of the present invention, the multitubular burner is a burner constituted of plural tubes, in which each spaces of the inside space of a central tube constituting the burner and interspaces between the plural tubes of the burner forms a nozzle of the burner. Also, the multitubular burner 21 shown in FIG. 2 is a quintuple tubular burner constituted of substantially coaxial (concentric) five tubes 21a, 21b, 21c, 21d and 21e. Here, the central tube 21a of the multitubular burner 21 forms a central nozzle. Also, each of interspaces between the central tube 21a of the multitubular burner 21, the respective four peripheral tubes 21b, 21c, 21d and 21e of the multitubular burner 21 forms a nozzle of the periphery. That is, an interspace between the central tube 21a and the first peripheral tube 21b provided in the surroundings of the central tube 21a forms a first peripheral nozzle. An interspace between the first peripheral tube 21b and the second peripheral tube 21c provided in the surroundings of the first peripheral tube 21b forms a second peripheral nozzle. An interspace between the second peripheral tube 21c and the third peripheral tube 21d provided in the surroundings of the second peripheral tube 21c forms a third peripheral nozzle. An interspace between the third peripheral tube 21d and the fourth peripheral tube 21e provided in the surroundings of the third peripheral tube 21d forms a fourth peripheral nozzle.

Incidentally, while the multitubular burner 21 has been shown in FIG. 2, the apparatus for feeding gasses for the production of a porous glass body is not limited to the multitubular burner, but it is also possible to use a burner of other type having plural nozzles. Also, the burner constituting multiple tubes is not limited to the quintuple tubes.

In the present invention, as shown in FIG. 2, preferably, a raw material mixed gas 22 is fed into the central nozzle of the multitubular burner 21, and simultaneously a reactant gas or noncombustible gas 23 is fed into each of the peripheral nozzles (first, second, third, and fourth peripheral nozzle) of the multitubular burner 21. In that case, it is possible to more uniformly deposit fine particles obtained by flame hydrolysis of the $SiO_2$ precursor gas and the $TiO_2$ precursor gas, on the seed rod 12.

Here, the raw material mixed gas 22 contains $SiCl_4$ as the $SiO_2$ precursor gas; $TiCl_4$ as the $TiO_2$ precursor gas; $H_2$ gas as the combustible gas; and $N_2$ gas as the noncombustible gas.

Meanwhile, $H_2$ gas as the combustible gas is fed from the first peripheral nozzle of the multitubular burner 21; a first $O_2$ gas as the combustion supporting gas is fed from the third peripheral nozzle of the multitubular burner 21; and a second $O_2$ gas as the combustion supporting gas is fed from the fourth peripheral nozzle of the multitubular burner 21.

In this way, in the case where both the combustible gas and the combustion supporting gas are fed from the peripheral nozzles, the respective gases are fed from the separate nozzles of the multitubular burner 21. In that case, it is possible to reduce or prevent combustion of the combustible gas and the combustion supporting gas in the vicinity of the nozzles of the multitubular burner 21. As a result, it is possible to reduce or prevent the generation of back fire in the nozzles of the multitubular burner 21 and damage of the nozzles of the multitubular burner 21.

Also, $N_2$ gas as the noncombustible gas is fed from the second peripheral nozzle of the multitubular burner 21. That is, the $N_2$ gas as the noncombustible gas is fed into the second peripheral nozzle of the multitubular burner 21 which is provided between the first peripheral nozzle into which the $H_2$ gas is fed and the third peripheral nozzle into which the first $O_2$ gas is fed.

Then, the raw material mixed gas 22 and the reactant gases which are fed from the multitubular burner 21 react with each other. In more detail, a flame (oxyhydrogen flame) is generated by reaction of the $H_2$ gas contained in the raw material mixed gas 22 and the $H_2$ gas fed from the peripheral nozzle with the first and second $O_2$ gases. Then, it may be considered that $SiCl_4$ and $TiCl_4$ contained in the raw material mixed gas 22 cause a hydrolysis reaction due to the $H_2$ gas contained in the raw material mixed gas 22, the $H_2$ gas fed from the peripheral nozzle, and the first and second $O_2$ gas fed from the peripheral nozzles. As a result, $SiO_2$ fine particles and $TiO_2$ fine particles are generated, whereby as shown in FIG. 1A, these fine particles deposit on the seed rod 12 to form the porous preform 14a.

In the method for producing a glass body according to the present invention, the flow rate of the raw material mixed gas fed from the central nozzle is 50% or more and not more than 90% of the largest flow rate among flow rate(s) of the combustible gas(es) and the combustion supporting gas(es) fed from the other nozzle or nozzles than the central nozzle. The flow rate of the raw material mixed gas is preferably 60% or more and not more than 80% of the largest flow rate among flow rate(s) of the combustible gas(es) and the combustion supporting gas(es) fed from the other nozzle or nozzles than the central nozzle.

For example, with respect to the flow rates of the gases fed from the multitubular burner 21 as shown in FIG. 2, a flow rate of the $H_2$ gas fed from the peripheral nozzle is larger than a flow rate of the first $O_2$ gas, and the flow rate of the first $O_2$ gas is larger than a flow rate of the second $O_2$ gas. That is, among the flow rates of the reactant gases fed from the peripheral nozzles, the flow rate of the $H_2$ gas is the largest flow rate. Then, the flow rate of the raw material mixed gas 22 is 50% or more and not more than 90% of this flow rate of the $H_2$ gas.

Here, since the flow rate of the raw material mixed gas 22 is 50% or more of the largest flow rate among the flow rates of the reactant gases fed from the peripheral nozzles (in this case, the flow rate of the $H_2$ gas), it is possible to reduce diffusion of $SiCl_4$ and $TiCl_4$ contained in the raw material mixed gas 22 due to the $H_2$ gas. As a result, it is possible to more efficiently deposit glass fine particles generated by the hydrolysis reaction on the seed rod 12. As a result, it is possible to enhance a yield of the porous preform 14a relatively.

Meanwhile, since the flow rate of the raw material mixed gas 22 is not more than 90% of the largest flow rate among the flow rates of the reactant gases fed from the peripheral nozzles, a residence time of $SiCl_4$ and $TiCl_4$ in the oxyhydrogen flame is relatively long. As a result, a time period for hydrolysis reaction of $SiCl_4$ and $TiCl_4$ is relatively long. In response thereto, it is possible to more satisfactorily achieve the hydrolysis reaction of $SiCl_4$ and $TiCl_4$. As a result, it is possible to obtain the titanium-containing porous preform 14a having more uniform concentration distribution.

In the case where it is intended to make the residence time of $SiCl_4$ and $TiCl_4$ in the oxyhydrogen flame relatively long by lowering all the flow rate of the raw material mixed gas 22 and the flow rates of the reactant gases fed from the peripheral nozzles, combustion of the combustible gas is terminated before the gases reach the deposition surface, so that the flame temperature on the deposition surface is largely lowered. For that reason, an effect of sintering of the porous body is lowered, so that the strength of the porous body is lowered and the porous body collapses during the synthesis. For the purpose of more satisfactorily achieving the hydrolysis reaction of $SiCl_4$ and $TiCl_4$ while keeping the effect of sintering on the deposition surface, it would be better to make the flow rate of the raw material mixed gas smaller than the flow rate of the reactant gas fed from the peripheral nozzle.

Figure 3A:
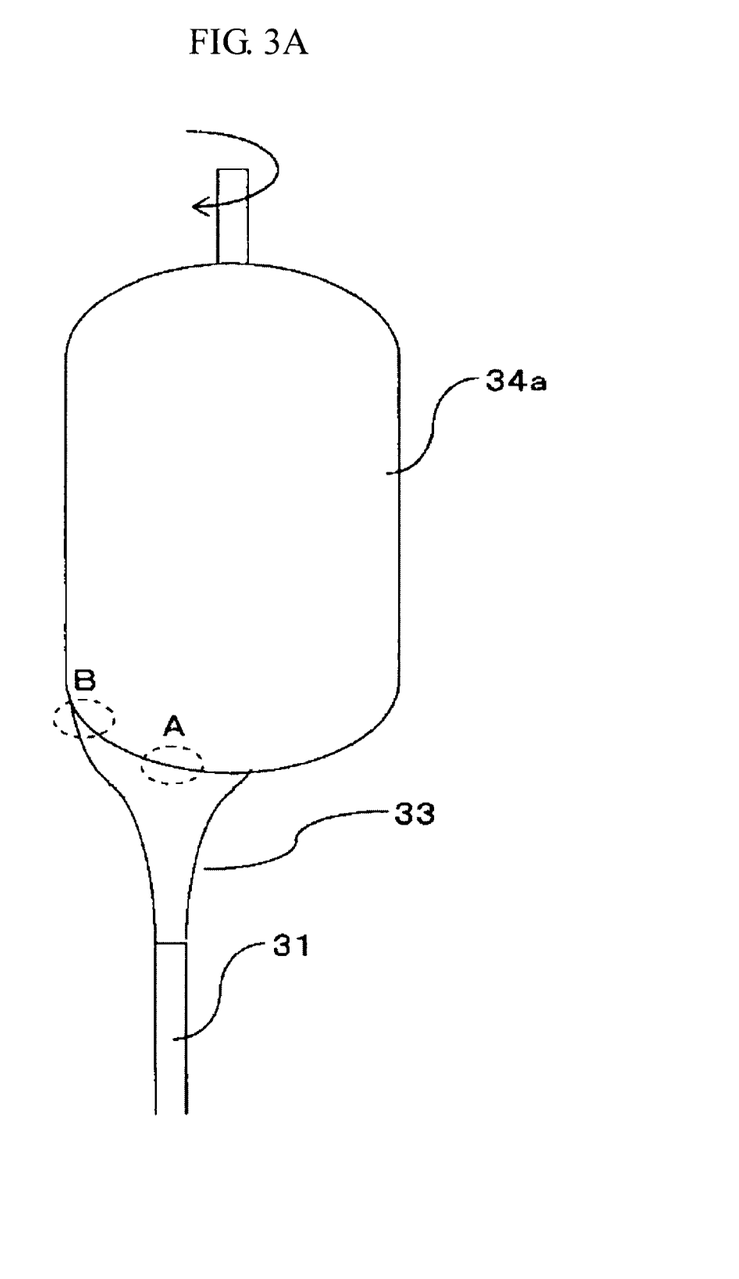
FIGS. 3A to 3C are each a view diagrammatically explaining an action and an effect of the production method of a porous glass body in the present invention.
Figure 3B:
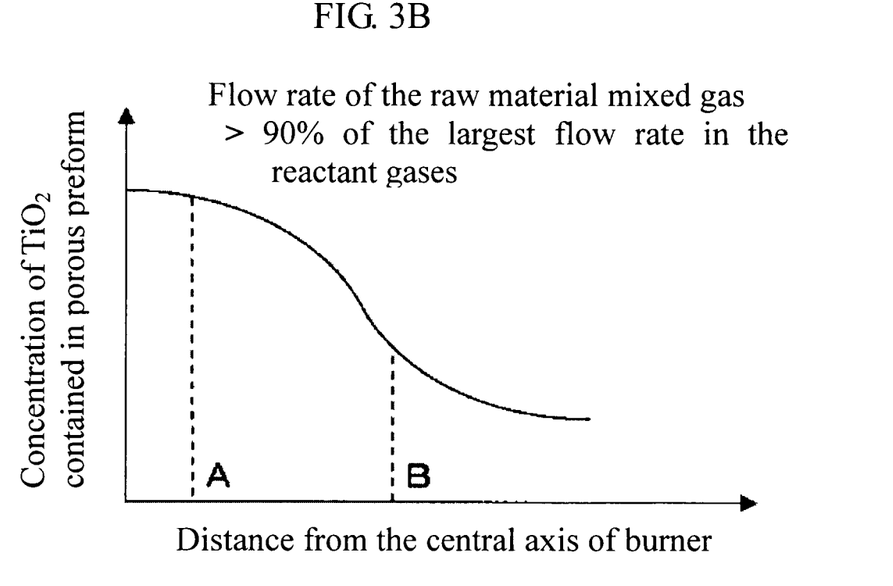
Figure 3C:
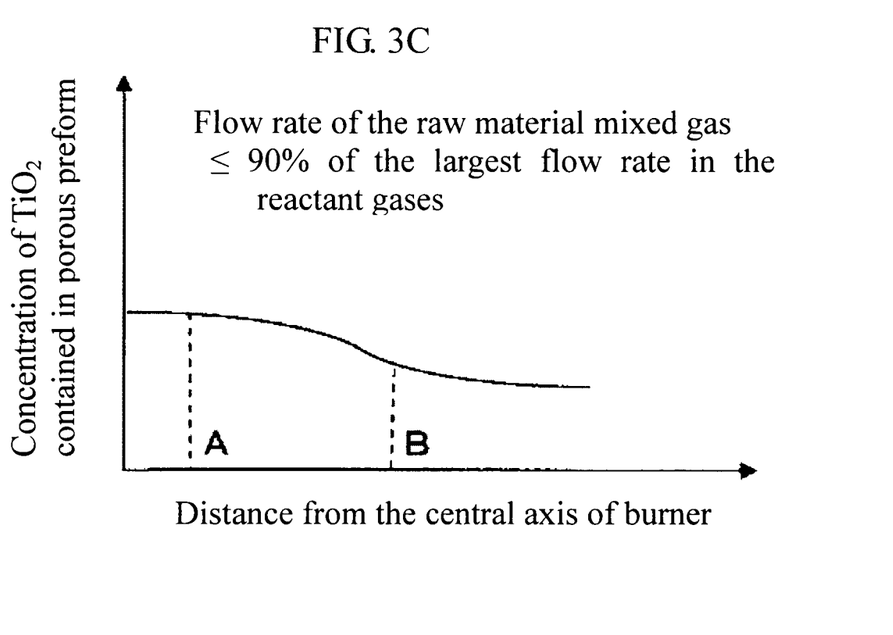

FIGS. 3A to 3C are each a view for diagrammatically explaining an action and an effect of a production method of a porous glass body in the case of producing a porous glass body by the method according to the present invention.

In the case where the flow rate of the raw material mixed gas exceeds 90% of the largest flow rate among flow rate(s) of the reactant gas(es) (in FIG. 2, the flow rate of the $H_2$ gas), the residence time of $SiCl_4$ and $TiCl_4$ in an oxyhydrogen flam 33 is relatively short.

At position A of a porous preform 34a in the vicinity of the central axis of a central nozzle of a multitubular burner 31 as shown in FIG. 3A, a distance from the multitubular burner 31 to the position A of the preform 34a is relatively short. For that reason, at the position A of the porous preform 34a shown in FIG. 3A, there may be the case where a time period for the hydrolysis reaction of $SiCl_4$ and $TiCl_4$ is insufficient. In general, since a rate of hydrolysis reaction of $TiCl_4$ is larger than a rate of hydrolysis reaction of $SiCl_4$, the hydrolysis reaction of $TiCl_4$ preferentially occurs as compared with the hydrolysis reaction of $SiCl_4$. Therefore, at the position A of the porous preform 34a, there may be the case where the hydrolysis reaction of $SiCl_4$ does not relatively sufficiently proceed as compared with the hydrolysis reaction of $TiCl_4$, and whereby a proportion of unreacted SiCl₄ in the oxyhydrogen flame 33 becomes high. As a result, as shown in FIG. 3B, at the position A of the porous preform 34a, a concentration of $TiO_2$ contained in the porous preform 34a is relatively high.

Meanwhile, at a position B of the porous preform 34a far from the central axis of the central nozzle of the multitubular burner 31 as shown in FIG. 3A, a distance from the multitubular burner 31 to the position B of the porous preform 34a is relatively long. For that reason, at the position B of the porous preform 34a shown in FIG. 3A, a time period for the hydrolysis reaction of $SiCl_4$ and $TiCl_4$ is relatively long. Therefore, at the position B of the porous preform 34a, the hydrolysis reaction of $SiCl_4$ more likely proceeds as compared with that at the position A of the porous preform 34a, so that there may be the case where a proportion of unreacted $SiCl_4$ in the oxyhydrogen flame 33 is relatively low. As a result, as shown in FIG. 3B, at the position B of the porous preform 34a, the concentration of $TiO_2$ contained in the porous preform 34a is relatively low.

In this way, supposing that the flow rate of the raw material mixed gas exceeds 90% of the largest flow rate among those of the reactant gases, as shown in FIG. 3B, there may be the case where a variation of the concentration (distribution) of $TiO_2$ contained in the porous preform 34a relative to the position of the porous preform 34a is relatively large.

On the other hand, in the production method of a glass body according to the present invention, the flow rate of the raw material mixed gas is not more than 90% of the largest flow rate among flow rate(s) of the reactant gas(es) (in FIG. 2, the flow rate of the $H_2$ gas). For that reason, the residence time of $SiCl_4$ and $TiCl_4$ in the oxyhydrogen flame 33 is relatively long. In response thereto, it is possible to more satisfactorily achieve the hydrolysis reaction of $SiCl_4$ and $TiCl_4$ in the oxyhydrogen flame 33. That is, it is possible to reduce a proportion of the unreacted $SiCl_4$ in the oxyhydrogen flame 33. As a result, as shown in FIG. 3A, a variation of the proportion of the unreacted $SiCl_4$ at the position A of the porous preform 34a in the vicinity of the central axis of the central nozzle of the multitubular burner 31 and at the position B of the porous preform 34a far from the central axis of the central nozzle of the multitubular burner 31 is reduced. In response thereto, a variation of the concentration (distribution) of titanium contained in the porous preform 34a at the position A of the porous preform 34a and at the position B of the porous preform 34a is reduced.

In this way, in the case where the flow rate of the raw material mixed gas is not more than 90% of the largest flow rate among flow rate(s) of the reactant gas(es), as shown in FIG. 3C, a variation of the concentration (distribution) of $TiO_2$ contained in the porous preform 34a relative to the position of the porous preform 34a is reduced. That is, the $TiO_2$-containing porous preform 34a having more uniform concentration distribution is obtained.

Also, the concentration of $TiO_2$ contained in the porous preform 34a correlates with a coefficient of thermal expansion of a $TiO_2$-containing quartz glass. According to the first embodiment of the present invention, since the titanium-containing porous preform 34a having more uniform concentration distribution is obtained, a $TiO_2$-containing quartz glass having a more uniform coefficient of thermal expansion is obtained.

In the light of the above, in the method for producing a glass material according to the first embodiment of the present invention, the flow rate of the raw material mixed gas is 50% or more and not more than 90% of the largest flow rate among those of the reactant gases, and therefore, it is possible to produce a glass material containing a metal dopant (such as $TiO_2$) having more uniform concentration distribution. Also, it is possible to produce a glass material having a more uniform coefficient of thermal expansion.

Also, in the case where the flow rate of the raw material mixed gas is 60% or more and not more than 80% of the largest flow rate among those of the reactant gases, it is possible to more easily produce a glass material containing a metal (such as titanium) having more uniform concentration distribution. Also, it is possible to more easily produce a glass material having a more uniform coefficient of thermal expansion.

A variation ($\Delta TiO_2$) of concentration distribution of $TiO_2$ in a $TiO_2$-containing quartz glass 14d is preferably not more than 0.20% by weight, more preferably not more than 0.15% by weight, still more preferably not more than 0.13% by weight, and most preferably not more than 0.10% by weight.

Also, a variation ($\Delta CTE$) of distribution of a coefficient of thermal expansion of the $TiO_2$-containing quartz glass 14d is preferably not more than 11.5 weight ppb/° C., more preferably not more than 8.6 weight ppb/° C., still more preferably 7.5 weight ppb/° C., and most preferably not more than 5.7 weight ppb/° C. corresponding to the variation ($\Delta TiO_2$) of concentration distribution of titanium oxide in the $TiO_2$-containing quartz glass 14d.

As described previously, according to the first embodiment of the present invention, since a $TiO_2$-containing quartz glass having a more uniform coefficient of thermal expansion can be obtained, uniformity of the distribution of a coefficient of thermal expansion of the glass substrate 15 shown in FIG. 1E becomes also high. For that reason, it may be expected that even when the glass substrate 15 is irradiated with extreme ultraviolet (EUV) light, a strain of the glass substrate 15 is small. For that reason, it is possible to use the glass substrate 15 for a substrate of an optical member which is used in an exposure tool for EUV lithography (optical member for EUV lithography). Examples of the optical member for EUV lithography include a mirror and a mask to be used in an exposure tool for EUV lithography, and a mask blank for producing a mask. Incidentally, EUV means a wavelength region of a soft X-ray and a wavelength region of vacuum ultraviolet light (wavelength region of 0.2 nm or more and not more than 100 nm).

In the production method of a glass body according to the present invention, it is preferable that the burner has further one or more nozzles fed with the combustible gas, the combustion supporting gas, a mixed gas containing the combustible gas, or a mixed gas containing the combustion supporting gas, other than the central nozzle (A) and the nozzle (B); and that the flow rate of the reactant gas fed from the nozzle spatially most far from the foregoing central nozzle (namely, the raw material mixed gas) is smaller than the flow rate of the raw material mixed gas, and preferably not more than 95% of the flow rate of the raw material mixed gas.

For example, in the case as shown in FIG. 2, the flow rate of the second $O_2$ gas fed from the fourth peripheral nozzle spatially most far from the central nozzle of the multitubular burner 21 feeding the raw material mixed gas 22, is 30% or more and not more than 95% of the flow rate of the raw material mixed gas 22.

In that case, it is possible to reduce diffusion of the $SiO_2$ precursor gas and $TiO_2$ precursor gas contained in the raw material mixed gas 22. As a result, it is possible to enhance a yield of the $TiO_2$-containing quartz glass.

In the production method of a glass body according to the present invention, preferably, the flow rate of the noncombustible gas is smaller than the flow rate of each of the raw material mixed gas and the reactant gas.

For example, in the case shown in FIG. 2, the flow rate of the $N_2$ gas fed from the second peripheral nozzle of the multitubular burner 21 is smaller than the flow rate of each of the raw material mixed gas 22, the $H_2$ gas, the first $O_2$ gas, and the second $O_2$ gas.

In that case, it is possible to enhance efficiency of the reaction of the raw mixed gas and the reactant gas(es). As a result, it is possible to enhance a yield of the $TiO_2$-containing quartz glass.

In the production method of a glass body according to the present invention, the flow rate of the raw material mixed gas is preferably 1 m/sec or more and not more than 5 m/sec, and more preferably 2 m/sec or more and not more than 3 m/sec. When the flow rate of the raw material mixed gas is 1 m/sec or more and not more than 5 m/sec, it is possible to more satisfactorily allow the $SiO_2$ precursor gas and the $TiO_2$ precursor gas to react with each other. Also, it is possible to more satisfactorily deposit the $SiO_2$ fine particles and the $TiO_2$ fine particles on the seed rod 12. For that reason, it is possible to more stably produce $TiO_2$-containing silica glass.

In the production method of a glass body according to the present invention, the effect of the present invention is pronounced in the case that, for example, a mass of the $TiO_2$-containing glass body to be produced is 50 kg or more. However, the production method according to the present invention can be applied to the case that a mass of the $TiO_2$-containing glass body to be produced is less than 50 kg.

In the case of producing a transparent vitrified body after producing a porous glass body, for example, a mass of the $TiO_2$-containing porous glass body is 50 kg or more. In that case, it is possible to provide 50 kg or more of a $TiO_2$-containing quartz glass (having a larger size) containing titanium having more uniform concentration distribution. Also, it is possible to provide 50 kg or more of a $TiO_2$-containing quartz glass (having a large size) having a more uniform coefficient of thermal expansion.

Though an upper limit of the mass of the $TiO_2$-containing glass body is not particularly limited, it is preferably not more than 500 kg, and especially preferably not more than 200 kg.

Next, a method for producing a glass material according to the second embodiment of the present invention is described.

Figure 4:
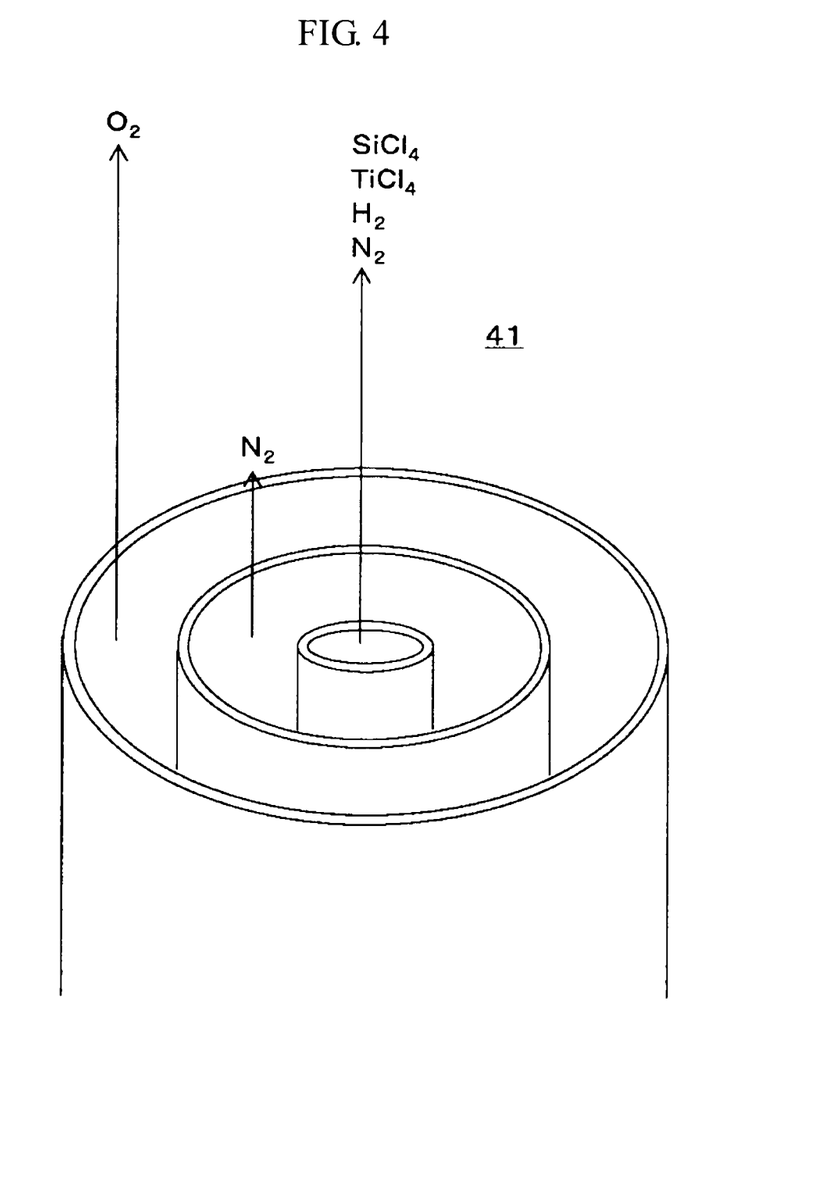
FIG. 4 is a view diagrammatically explaining the production method of a porous glass body in the present invention.

FIG. 4 is a view diagrammatically explaining the method for producing a glass material according to a second embodiment of the present invention.

In the method for producing a glass material according to the second embodiment of the present invention, a multitubular burner 41 that is a triple tubular burner as shown in FIG. 4 is used in place of the multitubular burner 21 that is a quintuple tubular burner as used in the production method of a glass body according to the first embodiment of the present invention.

The multitubular burner 41 shown in FIG. 4 contains a central nozzle; a first peripheral nozzle disposed concentrically with the central nozzle and adjacent to the central nozzle; and a second peripheral nozzle disposed concentrically with the central nozzle and adjacent to the first peripheral nozzle. Then, a raw material mixed gas is fed from the central nozzle of the multitubular burner 41. The raw material mixed gas contains, for example, $SiCl_4$ as an $SiO_2$ precursor gas, $TiCl_4$ as a $TiO_2$ precursor gas, $H_2$ as a combustible gas, and $N_2$ as a noncombustible gas. Also, $N_2$ gas as a noncombustible gas is fed from the first peripheral nozzle of the multitubular burner 41. Furthermore, $O_2$ gas as a combustion supporting gas is fed from the second peripheral nozzle of the multitubular burner 41.

Here, the reactant gas is only the $O_2$ gas as a combustion supporting gas, which is fed from the second peripheral nozzle of the multitubular burner 41. In that case, the largest flow rate among flow rate(s) of the reactant gas(es) is corresponding to a flow rate of the $O_2$ gas as a combustion supporting gas.

Then, a flow rate of the raw material mixed gas is 50% or more and not more than 90%, and preferably 60% or more and not more than 80% of the flow rate of the $O_2$ gas as a combustion supporting gas, which is corresponding to the largest flow rate among flow rate(s) of the reactant gas(es).

Next, a method for producing an optical member for EUV lithography according to the third embodiment of the present invention is described.

First of all, for example, a glass substrate of $TiO_2$-containing quartz glass is produced by adopting the foregoing production method of the present invention. That is, a silicon compound and a compound containing a metal serving as a dopant are hydrolyzed in a flame projected from a burner to form glass fine particles; and, while further heated at a temperature of a transparent vitrification temperature or higher, the formed glass fine particles are deposited and grown on a base material, thereby producing a transparent glass body.

Alternatively, a silicon compound and a compound containing a metal serving as a dopant are hydrolyzed in a flame projected from a burner to form glass fine particles; the formed glass fine particles are deposited and grown on a base material to produce a porous glass body; the porous glass body is then heated at a densifying temperature or higher to obtain a densified body; and thereafter, the densified body is further heated at a transparent vitrification temperature, thereby producing a transparent glass body.

The thus obtained transparent glass body is heated at a temperature of a softening point or higher and molded in a desired shape, followed by cutting in the desired size and shape to produce a glass substrate.

Subsequently, on the glass substrate, a plurality of layers of first dielectric material and a plurality of layers of second dielectric material are laminated alternately. Here, a refractive index of the layer of second dielectric material is different from a refractive index of the layer of first dielectric material. For example, the plural layers of first dielectric material and the plural layers of second dielectric material are a plurality of Mo layers and a plurality of Si layers, respectively. According to this, a laminate comprising the glass substrate, and the plural layers of first dielectric material and the plural layers of second dielectric material alternately laminated on the glass substrate is formed. The laminate has a reflective multi-layered film capable of reflecting EUV light having a specified wavelength.

In this way, it is possible to produce a glass substrate for a mirror or mask which is used for an exposure tool for EUV lithography. That is, the mirror which is used for an exposure tool for EUV lithography has a laminate comprising the glass substrate and the plural layers of first dielectric material and the plural layers of second dielectric material alternately laminated on the glass substrate.

Subsequently, if desired, a protective layer is provided on the obtained laminate. The protective layer protects the laminate comprising the alternately laminated plural layers of first dielectric material and plural layers of second dielectric material from etching.

Subsequently, a light absorbing layer capable of absorbing EUV light may be further provided on the protective layer provided on the laminate. The light absorbing layer may be, for example, a layer of Ta or a layer of Cr. The light absorbing layer absorbs the EUV light having a specified wavelength.

Subsequently, a photoresist layer may be provided on the light absorbing layer.

In this way, it is possible to produce a mask blank for producing a mask which is used for an exposure tool for EUV lithography. That is, the mask blank for the production of a mask which is used for an exposure tool for EUV lithography contains the glass substrate; the plural layers of first dielectric material and the plural layers of second dielectric material alternately laminated on the glass substrate; the protective layer; the light absorbing layer; and the photoresist layer.

Subsequently, the photoresist layer is subjected to patterning. That is, a prescribed pattern is drawn on the photoresist layer by irradiating the photoresist layer with ultraviolet light. Subsequently, the photoresist layer having a pattern drawn thereon is developed with a developing solution, thereby patterning the photoresist layer. According to this, the patterned photoresist layer is formed.

Subsequently, the light absorbing layer provided on the protective layer is etched according to the pattern of the patterned photoresist layer. According to this, the etched light absorbing layer and the patterned photoresist layer are formed on the protective layer.

Finally, the patterned photoresist layer is dissolved using a solvent, thereby removing the patterned photoresist layer from the etched light absorbing layer.

In this way, it is possible to produce a mask (or mirror) which is used for an exposure tool for EUV lithography. That is, the mask (or mirror) which is used for an exposure tool for EUV lithography contains the glass substrate; the plural layers of first dielectric material and the plural layers of second dielectric material alternately laminated on the glass substrate; the protective layer; and the patterned light absorbing layer.

According to the third embodiment of the present invention, the glass substrate is produced by adopting the method for producing a glass material according to the first embodiment of the present invention or the second embodiment of the present invention, so that it is possible to provide a method for producing an optical member for EUV lithography containing a glass substrate having a more uniform coefficient of thermal expansion.

EXAMPLES

Next, the Examples of the invention are described.

Example 1

Into a premixing tank kept at 75° C., 13.1% by mole of $SiCl_4$ gas, 0.5% by mole of $TiCl_4$ gas, 61.4% by mole of $H_2$ gas and 25% by mole of $N_2$ gas were introduced through different ports thereof from each other, and these gases were diffused and mixed within the premixing tank such that the gas concentration was uniform. Thereafter, by gradually elevating the temperature of a conduit, the gas mixture (raw material mixed gas) heated at 200° C. was fed into the central nozzle of a multitubular burner (undecaple tubular) through a static mixer manufactured by Apriori Corporation and a gas filter manufactured by Pall Corporation. The flow rate of the gas was 2.4 m/sec.

$H_2$ gas was fed into a first peripheral nozzle adjacent to the central nozzle of the multitubular burner, and its flow rate was the largest flow rate among those of all of the gases fed into the nozzles of the multitubular burner and was 3.4 m/sec.

$O_2$ gas was fed into a third peripheral nozzle further adjacent to a second peripheral nozzle adjacent to the first peripheral nozzle and into a fourth peripheral nozzle adjacent to the third peripheral nozzle, respectively. Flow rates thereof were the second largest flow rate and the third largest flow rate, respectively, among those of all of the gases fed into the nozzles of the multitubular burner, and they were 2.0 m/sec and 0.9 m/sec, respectively. $N_2$ gas was fed as a sealing gas into the second peripheral nozzle, and its flow rate was 0.5 m/sec.

The flow rate of the raw material mixed gas fed into the central nozzle of the multitubular burner was 71% of the flow rate of the gas having the largest flow rate (that of the $H_2$ gas fed from the first peripheral nozzle) among flow rates of the combustible gas and the combustion supporting gases fed from other nozzles than the central nozzle of the multitubular burner.

A $TiO_2$—$SiO_2$ porous glass body having a diameter of about 300 mm a length of about 500 mm, and a weight of about 10 kg was produced by hydrolysis reaction of $SiCl_4$ and $TiCl_4$ in an oxyhydrogen flame under this condition.

Subsequently, the obtained porous $TiO_2$—$SiO_2$ glass body was heated to 1,400° C. in a metalizing furnace under a vacuum condition, thereby obtaining a $TiO_2$—$SiO_2$ densified body (densification step).

The obtained $TiO_2$—$SiO_2$ densified body was subjected to a heat treatment at 1,660° C. for 2 hours, thereby obtaining a $TiO_2$—$SiO_2$ transparent glass body (vitrification step).

The obtained $TiO_2$—$SiO_2$ transparent glass body was further subjected to a heat treatment at 1,690° C. for 60 hours, thereby molding the $TiO_2$—$SiO_2$ transparent glass body into a block shape (molding step).

The molded $TiO_2$—$SiO_2$ glass body was cooled to 1,000° C.; subjected to annealing to 950° C. at a cooling rate of 10° C./hr and then to 900° C. at a cooling rate of 5° C./hr; kept at 900° C. for 70 hours; and then naturally cooled to room temperature, thereby obtaining a $TiO_2$-containing quartz glass material (annealing step).

The obtained $TiO_2$-containing quartz glass material was sliced into a plate form of 152 mm in square having a thickness of 6.35 mm. Seven samples in a plate form of 20 mm in square having parallel two sides in a diagonal direction and vertical two sides of the sliced glass material were cut out, and each of the samples was subjected to a fluorescent X-ray analysis, thereby measuring a $TiO_2$ concentration. The average value of the $TiO_2$ concentrations measured relative to each of the samples was 6.7% by weight. Also, the $\Delta TiO_2$ value that is a difference between the maximum value and the minimum value in the $TiO_2$ concentrations measured relative to each of the samples was 0.13% by weight.

Comparative Example 1

A $TiO_2$-containing quartz glass material having a weight of about 10 kg was produced in the same manner as in Example 1, except that the flow rate of the raw material mixed gas fed into the central nozzle of the multitubular burner was adjusted to 97% of the flow rate of the $H_2$ gas fed from the first peripheral nozzle of the multitubular burner (corresponding to the gas having the largest flow rate in the combustible gas and the combustion supporting gases fed from other nozzles than the central nozzle of the multitubular burner) (that is. the flow rate of the raw material mixed gas fed into the central nozzle of the multitubular burner was adjusted to 3.3 in/sec). Then, its $TiO_2$ concentration was measured. The average value of the $TiO_2$ concentrations and the $\Delta TiO_2$ value were 7.0% by weight and 0.47% by weight, respectively.

Comparative Example 2

It was intended to produce a $TiO_2$—$SiO_2$ glass body in the same manner as in Example 1, except that the flow rate of the raw material mixed gas fed into the central nozzle of the multitubular burner was adjusted to 41% of the flow rate of the $H_2$ gas fed from the first peripheral nozzle of the multitubular burner (corresponding to the gas having the largest flow rate in the combustible gas and the combustion supporting gases fed from other nozzles than the central nozzle of the multitubular burner) (that is, the flow rate of the raw material mixed gas fed into the central nozzle of the multitubular burner was adjusted to 1.4 m/sec). However, a $TiO_2$—$SiO_2$ glass body having a sufficiently large size and an appropriate shape could not be obtained. Also, at the time of lifting up the seed rod for forming a $TiO_2$—$SiO_2$ glass body, the obtained $TiO_2$—$SiO_2$ glass body collapsed.

While the embodiments and working examples of the invention have been specifically described, it should not be construed that the invention is limited to these embodiments and working examples. These embodiments and working examples of the invention can be modified and changed without deviating the gist and scope of the invention.

The present application is based on Japanese Patent Application No. 2010-146549 filed on Jun. 28, 2010, and the contents are incorporated herein by reference.

Industrial Applicability

The embodiments of the invention can be utilized for a method for producing a glass material and for a method for producing an optical member for EUV lithography.

Explanations of Letters or Numerals 11, 21, 31, 41: Multitubular burner
12: Seed rod
13: Flame
14a, 34a: Porous preform
14b: Densified preform
14c: Transparent glass body
14d: $TiO_2$-containing quartz glass
15, 51: Glass substrate
21a: Central tube
21b: First peripheral tube
21c: Second peripheral tube
21d: Third peripheral tube
21e: Fourth peripheral tube
22: Raw material mixed gas
23: Reactant gas or noncombustible gas
33: Oxyhydrogen flame

What is claimed is:

1. A method for producing a glass body, the method comprising:
feeding a raw material mixed gas through a central nozzle (A) positioned in a central portion of a burner, the raw material mixed gas comprising a gas of a silicon compound, a gas of a compound comprising a metal dopant, and a combustible gas;
feeding a combustible gas through a first nozzle directly adjacent to the central nozzle (A);
feeding a combustible gas or a combustion supporting gas through a second nozzle (B) different from the first nozzle and the central nozzle (A) of the burner;
optionally feeding a combustible gas, a combustion supporting gas, a mixed gas comprising a combustible gas, or a mixed gas comprising a combustion supporting gas through at least one nozzle (C) different from the central nozzle (A), the first nozzle, and the second nozzle (B);
hydrolyzing the silicon compound and the compound comprising the metal dopant, in a flame projected from the burner, to form glass fine particles; and
growing the glass fine particles on a base material,
wherein a flow rate of the raw material mixed gas is 50% or more and not more than 90% of a largest flow rate among flow rate(s) of the combustible gas(es) and the combustion supporting gas(es) fed through a nozzle or nozzles other than the central nozzle (A), and
the largest flow rate is provided in the first nozzle.

2. The method for producing a glass body according to claim 1, further comprising:
feeding a noncombustible gas through a nozzle provided between a nozzle through which a combustible gas or a mixed gas comprising a combustible gas is fed and a nozzle through which a combustion supporting gas or a mixed gas comprising a combustion supporting gas is fed.

3. The method for producing a glass body according to claim 1,
wherein the burner comprises the at least one nozzle (C) through which a combustible gas, a combustion supporting gas, a mixed gas comprising a combustible gas, or a mixed gas comprising a combustion supporting gas is fed, and
a flow rate of a gas fed through a nozzle spatially farthest from the central nozzle (A) is not more than 95% of the flow rate of the raw material mixed gas.

4. The method for producing a glass body according to claim 1, wherein the burner has a multitubular structure.

5. The method for producing a glass body according to claim 4,
wherein the burner comprises the central nozzle (A), a first peripheral nozzle which is the first nozzle directly adjacent to the central nozzle (A) and surrounding the central nozzle (A), a second peripheral nozzle surrounding the first peripheral nozzle, and a third peripheral nozzle which is the second nozzle (B) surrounding the second peripheral nozzle;
a noncombustible gas is fed through the second peripheral nozzle; and
a combustion supporting gas is fed through the third peripheral nozzle.

6. The method for producing a glass body according to claim 1, wherein the metal dopant is Ti.

7. The method for producing a glass body according to claim 1, wherein the raw material mixed gas is fed such that a mass of a finally obtained glass body is 50 kg or more.

8. A method for producing an optical member for EUV lithography, comprising:
forming a member from a glass body produced by the method according to claim 1.

9. The method for producing a glass body according to claim 1, wherein the flow rate of the raw material mixed gas is 60% or more and not more than 80% of the largest flow rate among flow rate(s) of the combustible gas(es) and the combustion supporting gas(es) fed through a nozzle or nozzles other than the central nozzle (A).

10. The method for producing a glass body according to claim 2, wherein the noncombusible gas is fed at a flow rate which is smaller than the flow rate of the raw material mixed gas, a flow rate of the combustible gas, and a flow rate of the combustion supporting gas.

11. The method for producing a glass body according to claim 3, wherein the flow rate of the gas fed through the nozzle spatially farthest from the central nozzle (A) is more than 30% of the flow rate of the raw material mixed gas.

12. A method for producing a glass body, the method comprising:
feeding a raw material mixed gas through a central nozzle (A) positioned in a central portion of a burner, the raw material mixed gas comprising a gas of a silicon compound, a gas of a compound comprising a metal dopant, and a combustible gas;

feeding a noncombustible gas through a first nozzle directly adjacent to the central nozzle (A);

feeding a combustion supporting gas through a second nozzle (B) directly adjacent to the first nozzle;

optionally feeding a combustible gas, a combustion supporting gas, a mixed gas comprising a combustible gas, or a mixed gas comprising a combustion supporting gas through at least one nozzle (C) different from the central nozzle (A), the first nozzle, and the second nozzle (B);

hydrolyzing the silicon compound and the compound comprising the metal dopant, in a flame projected from the burner, to form glass fine particles; and growing the glass fine particles on a base material, wherein a flow rate of the raw material mixed gas is 50% or more and not more than 90% of a largest flow rate among flow rate(s) of the combustible gas(es) and the combustion supporting gas(es) fed through a nozzle or nozzles other than the central nozzle (A), and the largest flow rate is provided in the second nozzle (B).

13. The method for producing a glass body according to claim 12, wherein the burner has a multitubular structure.

14. The method for producing a glass body according to claim 13, wherein the burner comprises the central nozzle (A), a first peripheral nozzle which is the first nozzle directly adjacent to the central nozzle (A) and surrounding the central nozzle (A), and a second peripheral nozzle which is the second nozzle (B) and surrounds the first peripheral nozzle.

15. The method for producing a glass body according to claim 12, wherein the burner comprises the at least one nozzle (C) through which a combustible gas, a combustion supporting gas, a mixed gas comprising a combustible gas, or a mixed gas comprising a combustion supporting gas is fed, and a flow rate of a gas fed through a nozzle spatially farthest from the central nozzle (A) is not more than 95% of the flow rate of the raw material mixed gas.

16. The method for producing a glass body according to claim 12, wherein the metal dopant is Ti.

17. The method for producing a glass body according to claim 12, wherein the raw material mixed gas is fed such that a mass of a finally obtained glass body is 50 kg or more.

18. A method for producing an optical member for EUV lithography, comprising:

forming a member from a glass body produced by the method according to claim 12.

19. The method for producing a glass body according to claim 12, wherein the flow rate of the raw material mixed gas is 60% or more and not more than 80% of the largest flow rate among flow rate(s) of the combustible gas(es) and the combustion supporting gas(es) fed through a nozzle or nozzles other than the central nozzle (A).

20. The method for producing a glass body according to claim 12, wherein the noncombusible gas is fed at a flow rate which is smaller than the flow rate of the raw material mixed gas, a flow rate of the combustible gas, and a flow rate of the combustion supporting gas.

* * * * *